P. MUELLER.
EEL GUARD FOR COCKS.
APPLICATION FILED AUG. 27, 1919.
1,345,946.
Patented July 6, 1920.
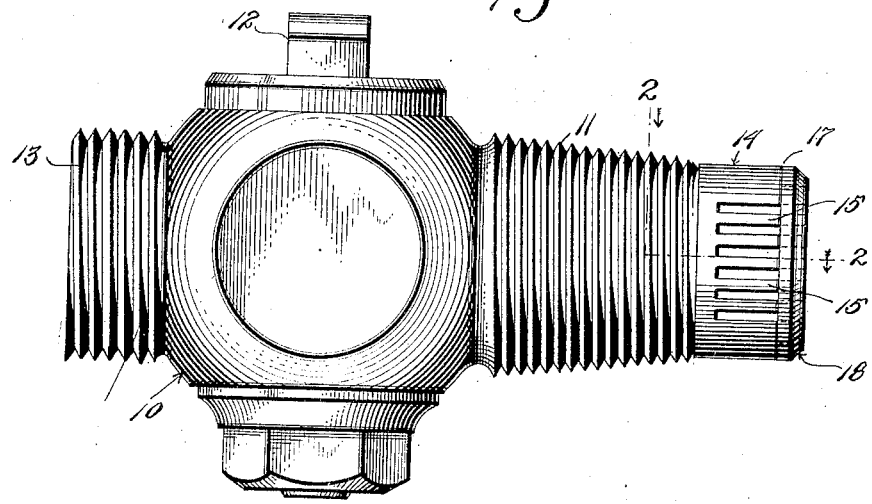
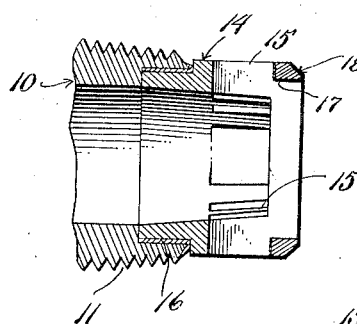
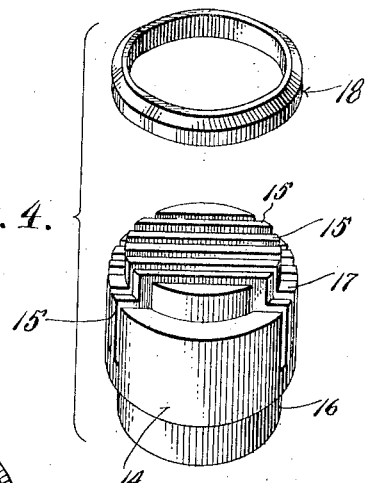
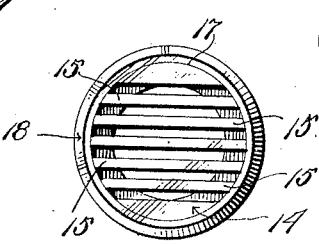
Inventor
Philip Mueller
By
Attorneys
Witnesses

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

EEL-GUARD FOR COCKS.

1,345,946.

Specification of Letters Patent.   Patented July 6, 1920.

Application filed August 27, 1919.  Serial No. 320,290.

*To all whom it may concern:*

Be it known that I, PHILIP MUELLER, a citizen of the United States, and residing at Decatur, in the county of Macon and State of Illinois, have invented new and useful Improvements in Eel-Guards for Cocks, of which the following is a specification.

This invention relates to eel guards for cocks and is designed particularly for use with corporation cocks of the type commonly used in connecting from a main to house service pipes. It will be understood however, that while designed and herein disclosed for that type of cock, its use is not limited to any specific form of cock as may obviously be employed wherever in fluid connections it is desirable to place a barrier or straining device to prevent the passage of foreign objects.

In the patent to Hieronymus Mueller, #639,903, granted December 26, 1899, an eel guard of the same general type is shown, which eel guard is efficient and satisfactory in many respects, but certain devices from a practical standpoint were present, which this invention is designed to overcome.

In order that the invention may be clear to those skilled in the art, I have illustrated in the accompanying drawings one embodiment of my invention, and in said drawings:

Figure 1 is a view in side elevation of a cock provided with a guard.

Fig. 2 is a longitudinal sectional view on substantially the line 2—2 of Fig. 1.

Fig. 3 is an end view of the guard.

Fig. 4 is a view in perspective of the guard and ring separated.

Referring to the drawings by numbers, like numbers indicating like parts in the several views, 10 indicates a corporation cock of any usual desired construction, that shown being of the well-known Mueller type and having a tapered and threaded end 11 which is screwed in to the top main in the usual manner, the key 12 and threaded service connection 13 being as usual.

To the threaded end 11 of the cock is secured the barrier or guard which consists of the cup-shaped member 14 which is slotted, as shown, so as to provide a series of bars 15 which will permit free passage of the water or other fluid, without any danger of clogging from sediment and will effectually bar the passage of any foreign bodies of considerable size into the service pipes.

This cup-shaped member is preferably formed by castings and the slots are then sawed in the closed end thereof, but it will be understood that it may be made in any suitable manner, this being one convenient method of forming the same.

While the slotted guard, thus described, may be formed integrally with the cock body, if desired a convenient way of making it is to form it as shown as a separate piece and then secure it in any suitable manner to the cock body. In the particular disclosure herein, the cup-shaped member 14 is provided at one end with the reduced portion 16 which seats in the end of the corporation cock and as shown, will be sweated to the cock, thus giving a secure and fluid-tight joint.

The guard is usually made of relatively soft metal as is common with plumbing goods, and a difficulty heretofore experienced with regard to the patent to Mueller, above referred to, has been that in the handling and shipping of cocks, the bars 15 would become bent and twisted, so that they would not be acceptable in some instances, and if installed in this transported condition, the guard would fail of its function.

In the present construction, this difficulty has been overcome by providing rigid means for staying the entire series of bars 15, without in any way interfering with the area for the fluid passage. I accomplish this, preferably in the manner shown by rabbeting the top of the bars 15 as shown at 17, the metal of the cup-shaped member 14 being preferably thickened slightly, as shown, to give sufficient area for rabbeting, and on the rabbet thus formed I seat a stay ring 18, which stay ring may be secured in any suitable manner as for example, by sweating it on as shown in the present instance. It will be observed that the ring 18 supports against displacement or distortion, each one of the bars 15 and without interfering with or interrupting the slots for the passage of fluid, so that the full area for the flow is provided, and yet the bars are securely held against accidental bending.

It will be understood that such mechanical variations from the construction disclosed as are within the knowledge of mechanical skill may be made, without departing from the spirit of my invention.

I claim:—

1. A guard for cocks comprising a cup-shaped body, the end of which is slotted to form a series of bars, and means to hold said bars against displacement.

2. A guard for cocks comprising a cup-shaped body, the end and side walls of which are slotted to form a series of bars, and means to hold said bars against displacement.

3. A guard for cocks comprising a cup-shaped body, the end and side walls of which are slotted to form a series of bars, and means surrounding said bars to hold them against displacement.

4. A guard for cocks comprising a cup-shaped body, the end and side walls of which are slotted to form a series of angularly meeting bars, and means surrounding said bars at substantially their meeting point to hold them against displacement.

5. A guard for cocks comprising a cup-shaped body, the end and side walls of which are slotted to form a series of bars, and a ring mounted on said bars to hold them against displacement.

6. A guard for cocks comprising a cup-shaped body having its end slotted to form a series of bars, ring-engaging means on said bars, and a ring engaging said means, to hold the bars against displacement.

7. A guard for cocks comprising a cup-shaped body having its ends slotted to form a series of bars, ring-receiving recesses in said bars, and a ring seated in said recesses to hold said bars against displacement.

8. A guard for cocks comprising a hollow body having its end and its side wall slotted to form a series of bars, an annular seat or rabbet formed at the juncture of said end and side walls, and a ring mounted in said seat and engaging said bars to hold them against displacement.

9. A guard for cocks comprising an annular cup-shaped body, the end and side walls of which are slotted to form a series of bars, said bars being recessed or rabbeted at their meeting ends, and a ring fitted and secured to said recess to hold said bars against displacement.

10. A guard for cocks comprising an annular cup-shaped body having its walls thickened toward its closed end and slotted to form a series of bars, a ring sweated into recesses formed in said bars at their meeting points, and a reduced cock-engaging portion at the opposite end of said body.

In testimony whereof I have hereunto set my hand.

PHILIP MUELLER.